United States Patent [19]
Karp et al.

[11] Patent Number: 5,946,716
[45] Date of Patent: Aug. 31, 1999

[54] SECTORED VIRTUAL MEMORY MANAGEMENT SYSTEM AND TRANSLATION LOOK-ASIDE BUFFER (TLB) FOR THE SAME

[75] Inventors: Alan H. Karp, Palo Alto; Rajiv Gupta, Los Altos, both of Calif.

[73] Assignee: Hewlett-Packard Company, Palo Alto, Calif.

[21] Appl. No.: 08/656,938

[22] Filed: May 30, 1996

[51] Int. Cl.[6] ........................................ G06F 12/10
[52] U.S. Cl. ................... 711/207; 711/212; 711/220; 711/144; 711/209
[58] Field of Search .................... 711/207, 212, 711/220, 144, 209, 203

[56] References Cited

U.S. PATENT DOCUMENTS

| 5,440,710 | 8/1995 | Richter et al. | 711/207 |
| 5,465,337 | 11/1995 | Kong | 711/207 |
| 5,475,827 | 12/1995 | Lee et al. | 711/207 |
| 5,668,968 | 9/1997 | Wu | 711/207 |
| 5,684,995 | 11/1997 | Yoshihara | 711/203 |
| 5,708,790 | 1/1998 | White et al. | 711/209 |

OTHER PUBLICATIONS

Patterson, David A. and Hennessy, John L., "Computer Architecture a Quantitative Approach", pp. 432–457, 1990.

*Primary Examiner*—Reginald G. Bragdon

[57] ABSTRACT

A memory management system is described which divides each virtual page into two or more sectors. Each of these sectors can then be individually loaded into memory in order to reduce bandwidth consumed loading virtual pages into a physical memory. A TLB for this system includes a plurality of TLB entries. Each TLB entry includes a variable physical page number (PPN FIELD) and a variable presence field. Each bit of the presence field indicates whether a corresponding sector is present in physical memory. The TLB entry also includes a page size field, which indicates the size of the corresponding virtual page. This size field also indirectly controls the number of sectors within that page and, thus, the number of presence bits required. As the page size grows the number of bits required to store the physical page number reduces. These unused bits are then consumed by additional presence bits so that all the bits in the TLB entry are used for all page sizes and number of sectors.

23 Claims, 6 Drawing Sheets

SECTORED VIRTUAL MEMORY MANAGEMENT SYSTEM AND TRANSLATION LOOK-ASIDE BUFFER (TLB) FOR THE SAME

BACKGROUND OF THE INVENTION

This invention relates generally to memory systems for computers and more particularly to cache organizations for virtual to physical address translation.

Virtual memory is an addressing scheme used in computer architectures to provide a computer programmer with a significantly larger address space than is physically present in the computer. Portions of the virtual memory space are mapped to portions of the physical memory space by way of a virtual-to-physical address translation. This translation is typically accomplished by a page table which, for a given virtual page number, produces a corresponding physical page number. This translation scheme requires the physical memory to be broken up into discrete portions or so-called pages. Pages of virtual memory can then be brought into the physical address space as needed by the operating system.

The selection of a page size involves a tradeoff. The smaller the pages the greater number of entries are required in the page table. As a result, more memory is consumed by the page table. Typically, this page table must be present in memory at all times. Making the pages larger, however, results in internal fragmentation when the program does not require all of the memory space of a given page. In addition, larger page sizes consume more I/O bandwidth and increase a process start-up time.

A technique that has been proposed for balancing these tradeoffs is providing variable page sizes. Typically, this technique allows the operating system to specify a different page size for a given process. The entries in the page table for the given process are then modified accordingly to reflect the change in the page size. Variable page sizes have a significant impact on the cache that is used to store the virtual-to-physical address translations. An example of a translation look-aside buffer used to store virtual-to-physical addresses is shown in FIG. 1. That TLB has a fixed-length tag stored in a content addressable memory (CAM). Varying the page size affects the number of bits that are required to be stored in the content addressable memory.

One approach to caching address translations for variable length pages is described in U.S. Pat. No. 5,465,337 issued to Kong, which discloses a memory management unit (MMU) for variable page sizes that includes a translation look-aside buffer (TLB) that accommodates the variable page sizes. The Kong TLB includes a plurality of entries, as with any TLB. Each entry includes a size field for specifying the size of the corresponding virtual page, a fixed virtual page field corresponding to the largest virtual page size, a variable length field that appends a variable number of bits to the fixed virtual page field depending on the specified size of the virtual page, and a corresponding physical address field. The MMU also includes means for comparing the correct number of bits of the variable length page number comprised of the fixed and variable length fields with a corresponding number of upper address bits in the upper address to identify whether there is a hit or miss in the TLB. If there is a hit, the TLB provides the corresponding physical address, which is then combined with an offset of the virtual address to form the complete physical address. One problem with the Kong approach is that each TLB entry includes unused bits for all but the smallest page size. Thus, the expensive TLB, both in terms of silicon area and manufacturing cost, is underutilized. Another disadvantage of Kong is that the entire page must be brought into memory and swapped out of memory at a time, regardless of how much will actually be required.

Accordingly, a need remains for a memory management scheme that does not suffer from the above-identified limitations.

SUMMARY OF THE INVENTION

It is, therefore, an object of the invention to provide a memory management system that does not suffer from the limitations of prior art systems.

Another object of the invention is to provide a translation look-aside buffer (TLB) for the same.

There are two aspects to the invention. The first is a new virtual memory organization and the second is a translation look-aside buffer (TLB) that accommodates this new memory organization. The virtual memory organization according to the invention decomposes each virtual page into two or more sectors. Each of these sectors can then be brought into physical memory (e.g., DRAM) from disk only as needed. This provides an additional level of resolution on virtual pages, which thereby minimizes memory and/or I/O bandwidth requirements by not bringing in unnecessary data into physical memory. The system further includes the ability to decompose a virtual page into a number of different sectors as determined by the operating system based on the characteristics of the data or the application. This system gives the operating system designer significant latitude in optimizing performance across a wide range of applications.

In the second aspect of the invention, a TLB is provided that accommodates the above-described virtual memory system. The TLB is compromised of a plurality of entries. Each entry includes four primary fields. The first is a tag field, which stores a virtual page number. A physical page number corresponding to the virtual page number is stored in a second field in the TLB entry. The length of this physical page number field varies according to a specified size stored in a size field in the TLB entry. The third field is a variable length field, as with the physical page number fields, and stores a variable number of presence and dirty bits. The number of bits in this field is determined by the number of sectors in the virtual page corresponding to this TLB entry. There is one presence bit and one dirty bit for each sector. In one embodiment, this field grows by a factor of two from a minimum of four bits to a maximum of sixteen bits as the virtual page size goes from a minimum of four kilobytes (4 KB), for example, to a maximum page size of sixteen megabytes (16 MB). In this way, the number of sectors increases by a factor of two for each successively larger page size, specified by the size field. The additional bits used by the variable P/D consume bits in the physical page number field so that, in this preferred embodiment, the number of bits in the physical page number field (N) plus the number of bits in the variable PD fields (P+D) remains constant for all of the various page sizes. This produces no unused bits in the TLB physical page number field.

Other embodiments of the TLB are also discussed, which allow the length of the variable P/D to grow by two bits per each successively larger page size. There are two versions of the TLB that permit this. In the first version, the upper two bits of the P/D are ignored where $\log_2(P+D)$ is a non-integer. This version requires equal-sized sectors. The second version that allows the variable P/D field to grow by two bits at a time does not place this same constraint on the size of the sectors. This second version allows for non-equal size sectors, thus, there can be any number of sectors for a given page. This version does add some additional complexity to the operating system, which must keep track of the sizes of the individual sectors. Any number of different conventions can be used to determine the sector sizes in these cases; the overriding requirement being that the sum of the sector sizes must be equal to the virtual page size. A simple example is for the case having three sectors, one sector can be one-half the page size while the other two can be equal to one-quarter of the page size. This second approach has the advantage of using all of the bits in each of the TLB entries regardless of the page size specified. It accomplishes this, however, at some additional level of complexity in the operating system which must keep track of the size of the individual sectors.

The preferred embodiment of the invention moves either the dirty bits or the presence bits to an address tag field, which is compared with the virtual page number to determine whether there is a hit. The other bits in the presence/dirty field remain in the PPN field. This embodiment uses all of the bits in the TLB entry for all page sizes since the number of bits in the presence and dirty fields grows at the same rate as the tag and PPN fields shrink as the page size is increased.

The foregoing and other objects, features and advantages of the invention will become more readily apparent from the following detailed description of a preferred embodiment of the invention which proceeds with reference to the accompanying drawings.

DETAILED DESCRIPTION

Figure 1:
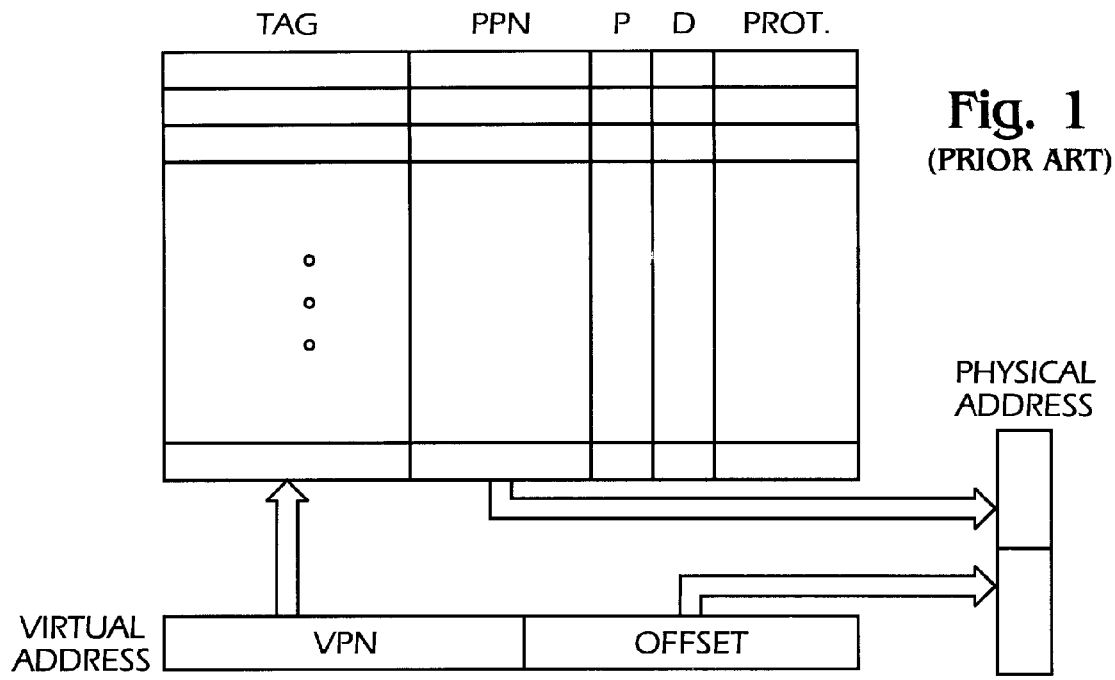
FIG. 1 is a block diagram of a prior art translation look-aside buffer (TLB).
Figure 2:
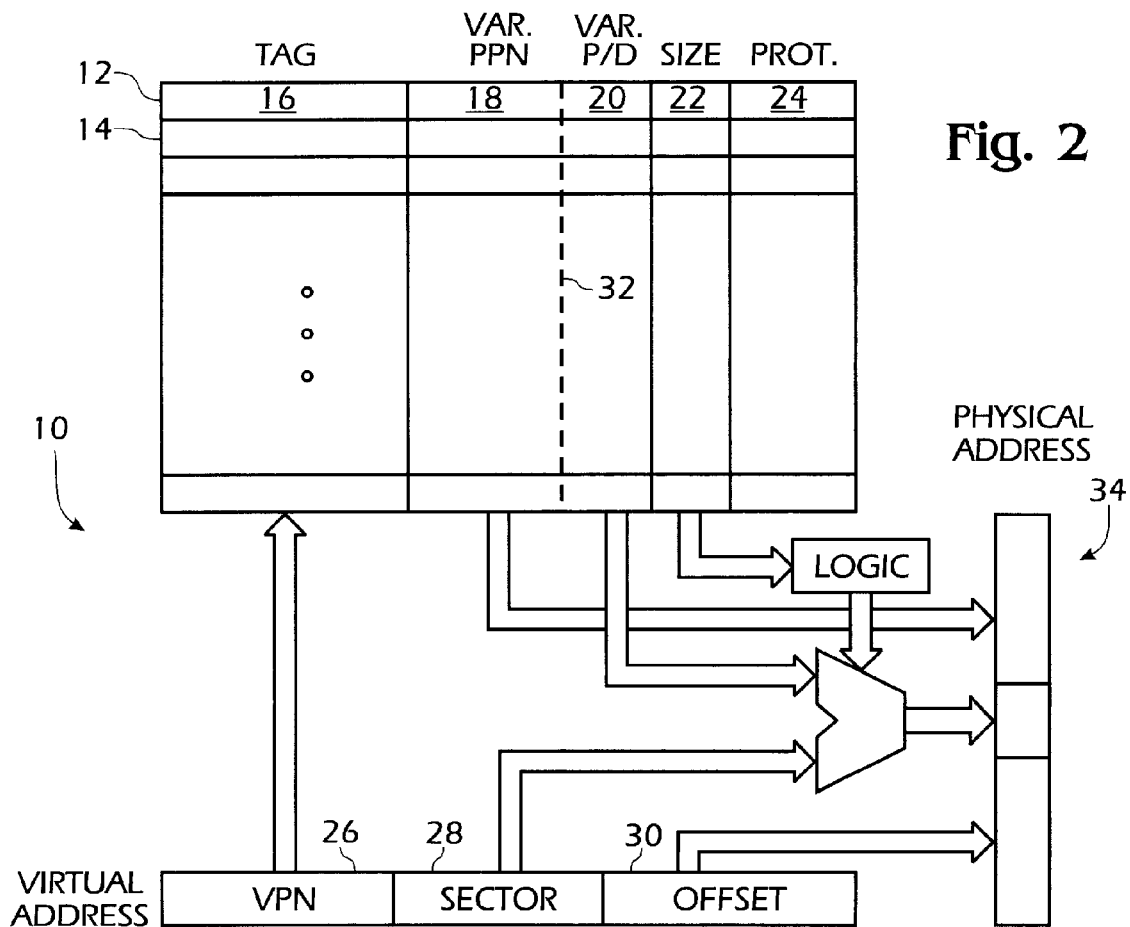
FIG. 2 is a block diagram of a TLB according to the invention having a variable length physical page number (PPN) and a variable length presence/dirty field (P/D).

Referring now to FIG. 2, a translation look-aside buffer according to the invention is shown generally at 10. The TLB 10 can take any number for forms including fully associative, set associative or direct-mapped depending upon the requirements of the computer system. In the preferred embodiment, the TLB 10 is fully associative to produce the highest hit rate therein, but is not limited thereto.

The TLB includes a plurality of TLB entries, such as entry 12 and 14. Each entry is comprised of a plurality of fields. Each of these fields will now be described with reference to TLB entry 12. This description, applies equally as well as to all other entries (e.g., 14) in the TLB. The first field in TLB entry 12 is a tag field 16, which stores a virtual page number. This virtual page number is comprised of the uppermost bits of the virtual address which this entry 12 corresponds to. It is the contents of this field 16 that is compared to a corresponding VPN field 26 in the virtual address, among other bits as will be described further below, to determine whether there is a hit in the TLB or a miss. As such, it is referred to as a tag. A variable number of these bits are used in the comparison depending on the size of the page for this entry.

The next two fields are considered together since the boundary between them varies as indicated by the dashed line 32 running between these two fields. The second field is a variable length physical page number field 18. This field stores a variable number of bits corresponding to the upper address bits of a physical address that corresponds to the virtual page number stored in the tag field 16. It is the contents of this field 18 that is combined with certain bits of a sector field 28 and an offset field 30 of the virtual address to form the physical address shown generally at 34. The precise manner in which these fields are combined is discussed further below. The length of the PPN field 18 varies according to the virtual page size specified in a size field 22 of the TLB entry 12. This size field 22 also indirectly determines the number of sectors for the corresponding virtual page.

Field 20, as with field 18, includes a variable number of bits. This field 20 is comprised of two separate fields: a presence field that includes a plurality of presence bits, each of which indicates whether a corresponding sector is present in physical memory, and a dirty field, which includes a plurality of dirty bits where each dirty bit indicates whether a corresponding sector has been written to and is therefore dirty. The length of this variable P/D field 20 is determined indirectly by the page size specified by field 22. The contents of the size field 22 determines the number of bits required by the variable length PPN field 18. The variable length P/D field 20 occupies the unused bits in the variable PPN field 18 as the size of the page grows from a minimum to a maximum. This produces no unused bits in the PPN field 18 regardless of the page size specified in the size field 22. The relationship between these two fields 18 and 20 is discussed in further detail with respect to FIGS. 3–5 below.

The final field shown for the TLB is a protection field 24 that stores various protection bits associated with the corresponding virtual page. These protection bits provide the operating system with certain levels of security to prohibit unauthorized access to certain data in memory. The use of such protection fields are well known in the art of computer design. Additional fields can also be included in the TLB entries such as a user/supervisor field as well as others as are known in the art. The TLB according to the invention is not limited to the exact number of fields shown in FIG. 2.

Figure 3:
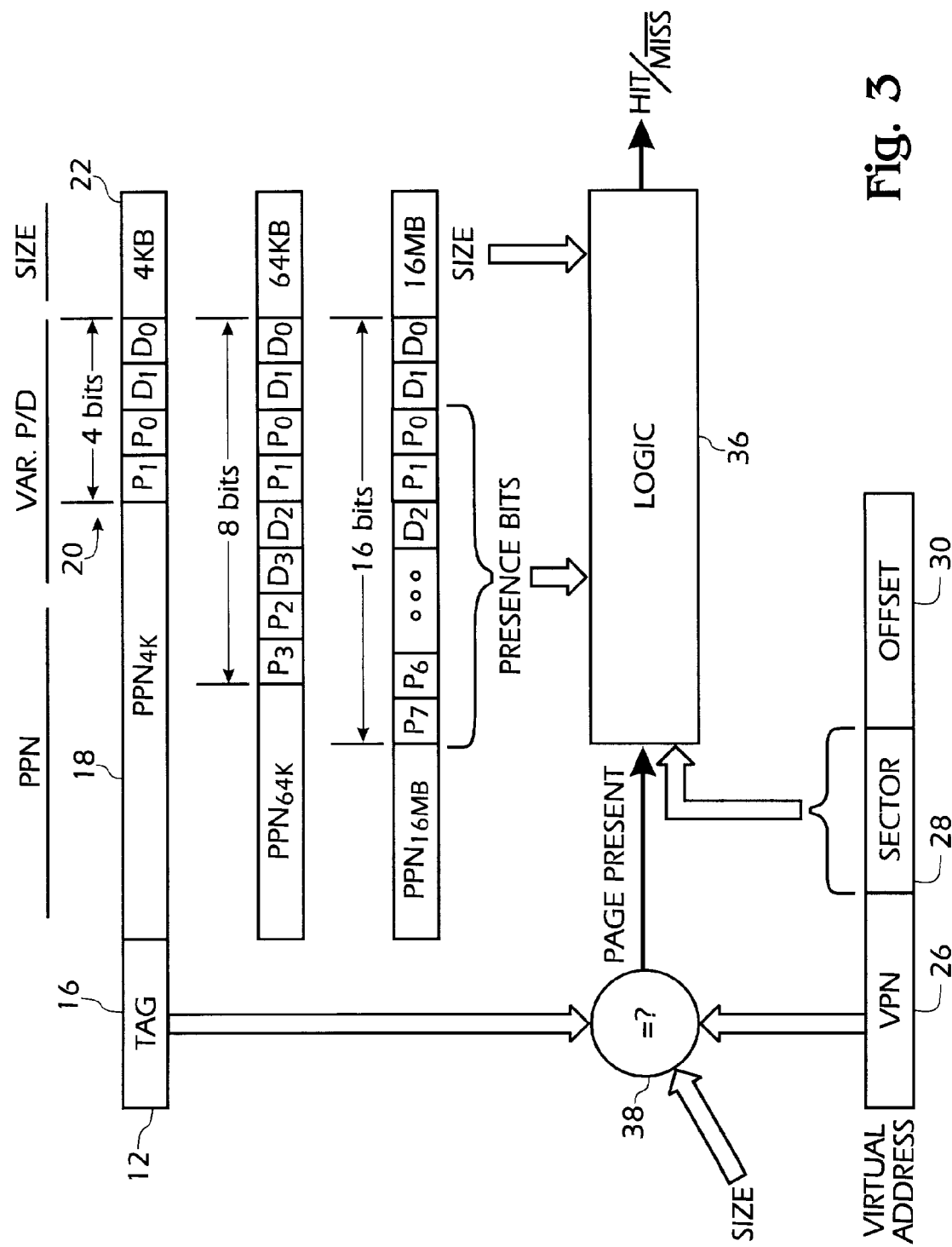
FIG. 3 is a more detailed illustration of one of the TLB entries of the TLB of FIG. 2 showing the allocation of the bits among the various fields for three different page sizes.

A more detailed illustration of TLB 12 is shown in FIG. 3. The contents of the various fields are shown for three different page sizes: 4 KB, 64 KB and 16 MB. These sizes are meant by way of illustration and not by way of limitation. In the first case, a page size of 4 KB is specified in the size field 22. In the preferred embodiment, this is the smallest allowable page size. In other embodiments, however, this page size can be smaller than 4 KB. This size field then determines the length of the variable length PPN field 18. The number of bits in field 18 is determined according to the following expression:

$$PPN = L - \log_2(SIZE)$$

where SIZE is equal to the size specified in the size field 22 and L is equal to the number of bits in the physical address.

The variable length P/D field 20 includes four bits: two presence bits ($P_1$, $P_0$) and two dirty bits ($D_1$, $D_0$). Each presence bit indicates whether a corresponding sector of the page is currently present in physical memory. Similarly, each dirty bit indicates whether the corresponding sector has been written to, i.e., is dirty. Thus, there are two sectors for the 4 KB page specified. In the preferred embodiment, there are at least two sectors for each page. However, this is not a requirement for the TLB organization.

The second case shown in FIG. 3 is for a page size of 64 KB. It will be apparent to those skilled in the art that the physical page number (PPN) includes four fewer bits for a 64 KB page than the physical page number for a 4 KB page since $2^4=16$. These four fewer bits are consumed by four additional bits in the variable P/D field. Two of the four additional bits are used for additional presence bits $P_3$ and $P_2$. The other two bits are used for two additional dirty bits $D_3$ and $D_2$. Since there are four presence bits and four dirty bits and variable P/D fields supports four sectors. Thus, the number of sectors has grown by a factor of two from the 4 KB page size to the 64 KB page size. The number of sectors grows by a factor of two with each successively larger page size. To further illustrate this point, a 16 MB page size is also shown in FIG. 3. In this case, the variable P/D field includes 16 bits: eight presence bits ($P_0$–$P_7$) and eight dirty bits ($D_0$–$D_7$). The length of the physical page number field 18 is reduced accordingly. The 16 MB page size thus includes eight sectors with each presence and dirty bit associated with a corresponding sector. In the preferred embodiment, the presence and dirty bits with the same subscript correspond to the same sector. Preferably, as shown in FIG. 3, the presence and dirty bits for the smaller page sizes remain in the same position in the P/D field as the page size grows. This layout facilitates the actual hardware implementation. Logically, however, these bits can occupy any position in the P/D field as the page size goes from one size to the next.

The TLB also includes a logic block 36 and a comparator 38 that indicates whether there is a hit or miss in the TLB for the given virtual address. The comparator 38 compares the contents of the tag field 16 with the virtual page number 26 of the virtual address. If the two are identical, the comparator 38 indicates that the page represented by the virtual page number 26 is present in physical memory. The comparator 38 compares a variable number of bits in the VPN field 26 to a corresponding number of bits in the tag field 16 depending on the size of the page as specified by the size field.

The logic block 36 receives the output signal Page Present from the comparator 38 along with a sector field 28 of the virtual address, the presence bits of the TLB entry, and the size bits from the size field to determine whether or not the sector, as specified by the sector field 28, is present within memory. Because the sectors are brought in only as needed, i.e., on demand, even though the comparator indicates that the page is present in memory, this does not necessarily mean that the required sector is present. It only means that one of the sectors of the page is present in physical memory. Logic 36 takes these inputs and generates a HIT/MISS signal if the sector specified by the virtual address is actually present in physical memory. The exact implementation of the logic blocks is dependent upon the particular organization of the TLB chosen, e.g., fully associative or direct mapped. One of ordinary skill in the art could implement the logic block 36 and the comparator 38 according to the description contained herein.

The logic block 36 uses the size field to determine which of the bits in the variable P/D represent the presence bits within the field. As is apparent from FIG. 3, the presence bits for sectors 1 and 0, for example, change position within the field depending upon the size of the page as specified by the size field. The size field similarly determines which address bits in the virtual address specify the sector number. For a 4 KB page only the uppermost bit of the sector field encodes the desired sector number since there are only two sectors for that page size. For the 16 MB page size, on the other hand, the sector field 28 includes three address bits of the virtual address adjacent the virtual page number field 26 since the 16 MB page includes eight such sectors. The length of the offset field 30 also changes depending upon the number of bits required to encode the sector.

If the logic block 36 indicates a hit, the physical page number (PPN) field 18 of the TLB entry is combined with the sector and offset fields 28 and 30 of the virtual address to form the actual physical address, as described further below. The number of bits in each of the fields is illustrated below in Table 1 for a virtual address of 128 bits and a physical address of 32 bits. Other length addresses can also be used. The "Sub" field in the "PPN Field" is the sub-total of the bits in the two sub-fields that make up the "PPN Field," i.e., "PPN" and "P/D."

TABLE 1

Example with P/D bits all within PPN field.

| PAGE SIZE | VIRTUAL ADDRESS (128 BITS) | | | TLB ENTRY | | | | |
|---|---|---|---|---|---|---|---|---|
| | VPN | Sector | Offset | TAG | PPN Field | | | |
| | | | | | PPN | P/D | Sub | Total |
| 4K (2 sectors) | 116 | 1 | 11 | 116 | 20 | 4 | 24 | 140 |
| 64K (4 sectors) | 112 | 2 | 14 | 112 | 16 | 8 | 24 | 136 |
| 16M (8 sectors) | 104 | 3 | 21 | 104 | 8 | 16 | 24 | 128 |

Figure 4:
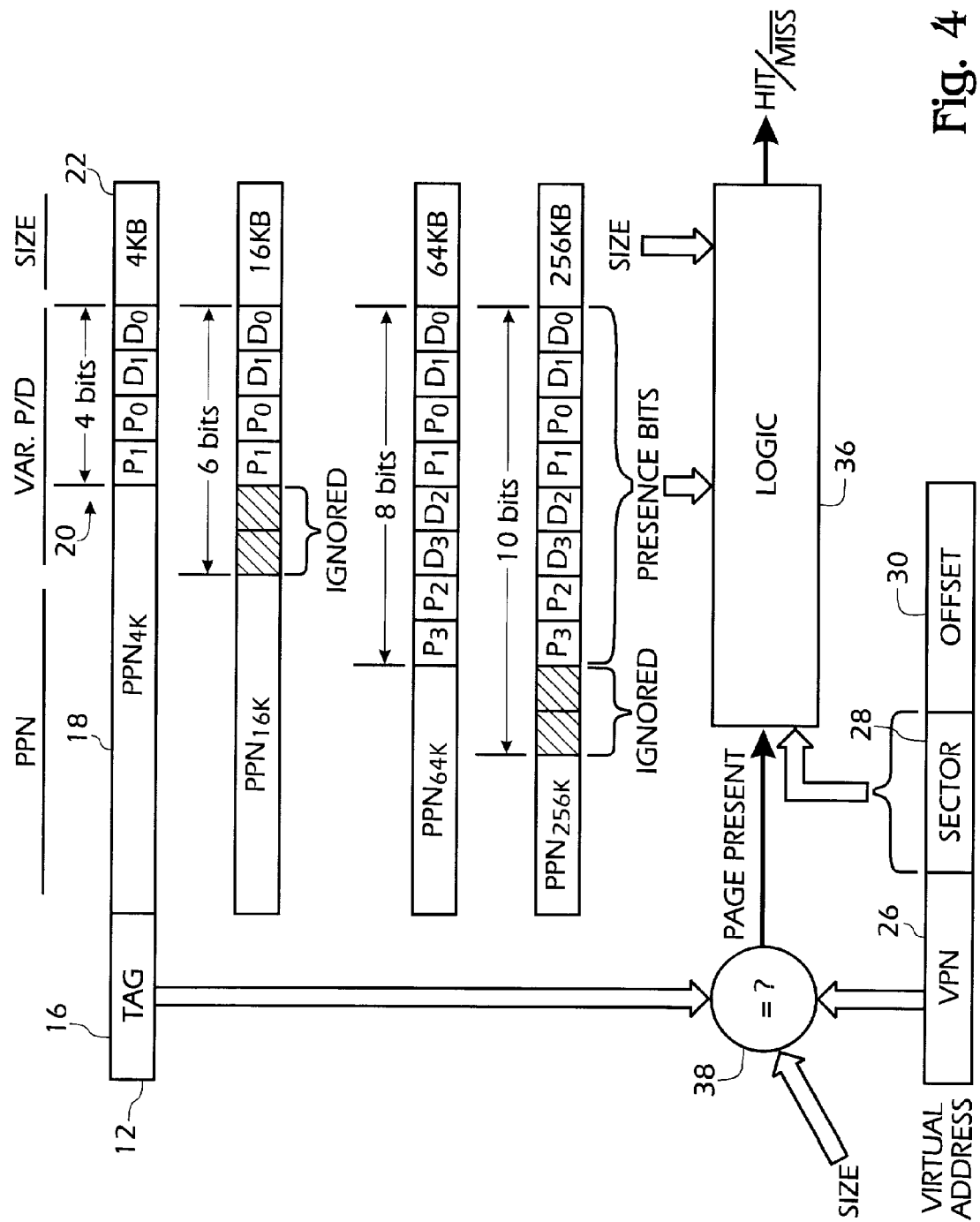
FIG. 4 is a second embodiment of the TLB of FIG. 2 that allows the number of bits in the variable length P/D field to increase by two bits for each successively larger page size.

Another embodiment of the TLB shown in FIG. 2 is illustrated in FIG. 4. In this embodiment the variable P/D field 20 is permitted to grow by two bits with each successive increase in the page size. This allows for greater control over the page size. As shown in FIG. 4, page sizes of 4 KB, 16 KB, 64 KB and 256 KB are allowed. These sizes are by way of illustration, not for purposes of limitation. Since the page size grows by a factor of four with each successive increase of the page size, the physical page number field length is reduced by two bits since $2^2=4$. The variable P/D field 20, however, does not consume all of these bits in every case. The embodiment shown in FIG. 4 only allows the page to be divided into a number of sectors that are a power of two, e.g., 2, 4 or 8. This is the case, in fact, for the 4 KB page since there are two sectors supported by the variable P/D field. For the 16 KB page, however, the variable P/D 20 includes 6 bits. Six bits can support at most three sectors. Three is not a factor of two, so two of the bits in the variable P/D field go unused or are ignored as indicated in FIG. 4. For the next sized page of 64 KB all of the variable P/D bits are again used. In that case, the variable P/D includes 8 bits, which can support 4 sectors. When the page size increases to 256 KB, however, two of the bits in the P/D field 20 are again disregarded. The TLB could be extended to support additional larger page sizes beyond 256 KB, but even more bits of the P/D are ignored until the page size reaches 16 MB when all 16 bits of the P/D field are again consumed. For a 4 MB page, though, six bits of the P/D field 20 will be unused. Thus, the added flexibility in specifying the page size comes with a price.

Figure 5:
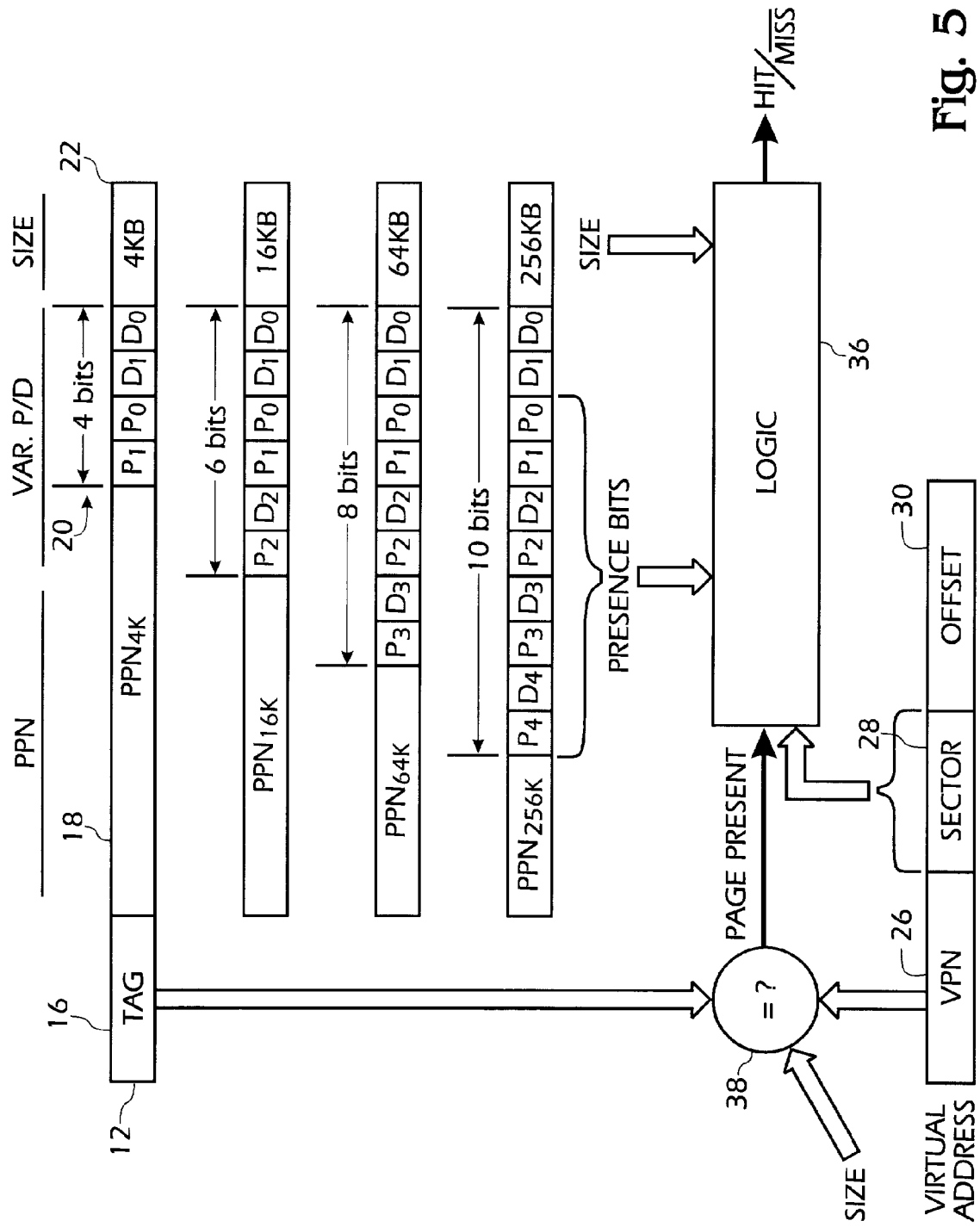
FIG. 5 shows a third embodiment of the TLB entry of FIG. 2 that also allows the variable length P/D to increase by two bits for each successively larger page size, but which does not result in unused bits for certain page sizes, as did the second embodiment shown in FIG. 4.

A third embodiment of the TLB according to the invention is shown in FIG. 5. This embodiment overcomes the limitation of the embodiment shown in FIG. 4 in that all of the bits in the PPN field are used regardless of the page size. To put this another way, the sum of the length of the physical page number field 18 plus the length of the variable P/D field 20 remains constant across all page sizes. The version shown in FIG. 5, in fact, supports a page comprised of any integer number of sectors. The 4 KB page size includes two sectors, the 16 KB page size includes three sectors, the 64 KB page size includes four sectors and so on, with the number of sectors growing by one for each successive increase in the page size.

For a page size with a number of sectors that is not a power of 2, the sector sizes are unequal. For example, for the 16 KB page size, the P/D field 20 supports three sectors. Since it is difficult to divide a page into thirds, the operating system according to the invention adopts a scheme whereby one of the sectors, e.g., sector zero, comprises one-half of the page (8 KB) and the other two sectors comprise one-quarter of the page (4 KB). Thus, the sectors taken together make up the entire page, but each page does not have a uniform size. This adds additional complexity to the operating system, but which can be easily managed in software once the convention is chosen. The 4 KB page and the 64 KB page, on the other hand, do not pose this problem since in each case the page can be divided into equal sized sectors. The 256 KB page, however, poses the same problem as the 16 KB page in that there are again an odd number of pages. Again, a convention can be adopted whereby certain sectors or certain sizes and others or other sizes so that the sectors taken together make up the entire page. Similar conventions can be adopted for other page sizes not shown in FIG. 5, but which could be supported by the invention.

Figure 6:
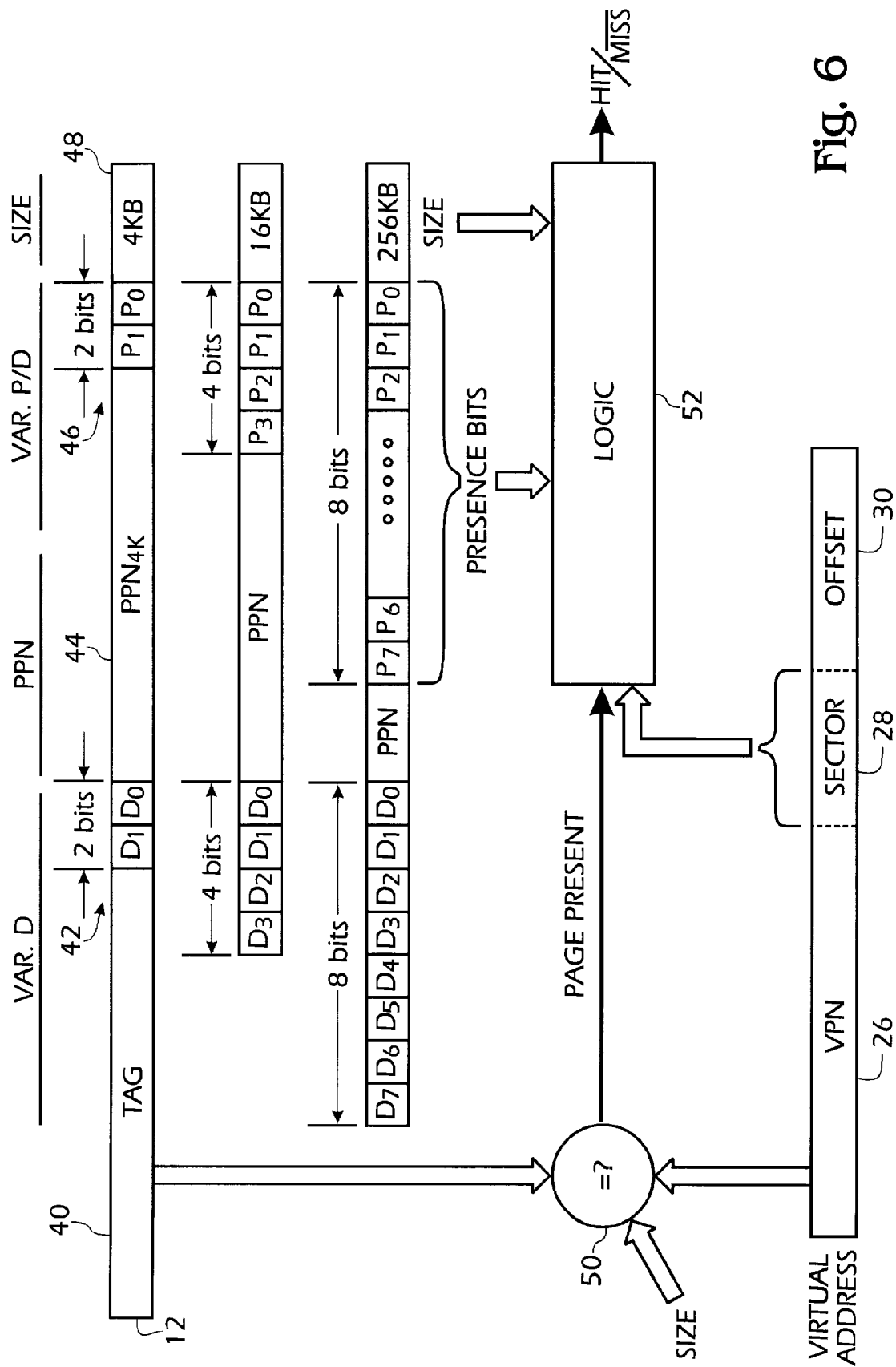
FIG. 6 shows a fourth and preferred embodiment of the TLB of FIG. 2 that includes the dirty bits in the variable length tag field so that all bits in the TLB are used for all page sizes.

Another embodiment of the invention is shown in FIG. 6. In this embodiment only the presence bits are within the variable PPN while the dirty bits have been moved to the variable length tag field. Since this field also expands and contracts with the virtual page size, the presence bits could be located in the tag field and the dirty bits in the PPN field. This embodiment has the further advantage of using those bits in the tag field, as well as those in the PPN field, that would otherwise go unused as the page size changes.

FIG. 6 shows three different page sizes (4 KB, 16 KB, and 256 KB) for a given TLB entry 12. The 4 KB page includes two sectors and thus has two dirty bits in a variable length dirty field 42 and two presence bits in a variable length presence field 46. A tag field 40 is shown adjacent to the variable dirty field 42 while a variable length PPN field 44 is adjacent to the variable presence field 46. The number of bits in the tag field 40 plus the number of bits in the dirty field 42 is a constant in this implementation across all of the page sizes. This is not true in the other embodiments shown above since the length of the tag field varies with the size of the page. In the other embodiments, these bits in the tag field went unused. In this embodiment, they are consumed by either the dirty bits, as shown in FIG. 6, or alternatively, by the presence bits.

The second case shown in FIG. 6 is for a page size of 16 KB. This sized page includes four sectors and thus consumes four presence bits and four dirty bits. The four presence bits ($P_0$–$P_3$) occupy the unused bits in the PPN field 44 while the four dirty bits ($D_0$–$D_3$) occupy the unused bits in the tag field. A similar result is achieved for the 256 KB page, which uses eight sectors and thus eight presence bits ($P_0$–$P_7$) and eight dirty is bits ($D_0$–$D_7$). An example of the allocation of these bits for a virtual address of 128 bits and a physical address of 32 bits is shown below in Table 2. In Table 2, it is clear that the tag field includes a constant 118 bits for all three page sizes. Similar results can be achieved for other page sizes and, accordingly, the invention is not limited to those page sizes shown or described herein. The PPN field also includes constant 22 bits across all page sizes yielding a total of 140 bits for the entire TLB entry in all cases with no unused bits. This results in a maximum memory utilization for the TLB memory.

TABLE 2

Example with dirty bits as part of tag field.

| | VIRTUAL ADDRESS | | | TLB ENTRY | | | | | | |
|---|---|---|---|---|---|---|---|---|---|---|
| | (128 BITS) | | | TAG Field | | | PPN Field | | | |
| PAGE SIZE | VPN | Sector | Offset | TAG | Dirty | Sub | PPN | Presence | Sub | Total |
| 4K (2 sectors) | 116 | 1 | 11 | 116 | 2 | 118 | 20 | 2 | 22 | 140 |
| 16K (4 sectors) | 114 | 2 | 12 | 114 | 4 | 118 | 18 | 4 | 22 | 140 |
| 256K (8 sectors) | 110 | 3 | 15 | 110 | 8 | 118 | 14 | 8 | 22 | 140 |

The "Sub" fields within the "TAG Field" and the "PPN Field" in Table 2 are the sum of the bits for the sub-fields for the corresponding fields, e.g., PPN_Sub=PPN+Presence. This same relationship holds for Table 1. As is shown therein, the number of bits used in the "TAG Field" and the "PPN Field" remains constant across all Page Sizes. Moreover, all 140 bits of the TLB entry are used for each page size. This arrangement yields the maximum memory utilization.

Figure 7:
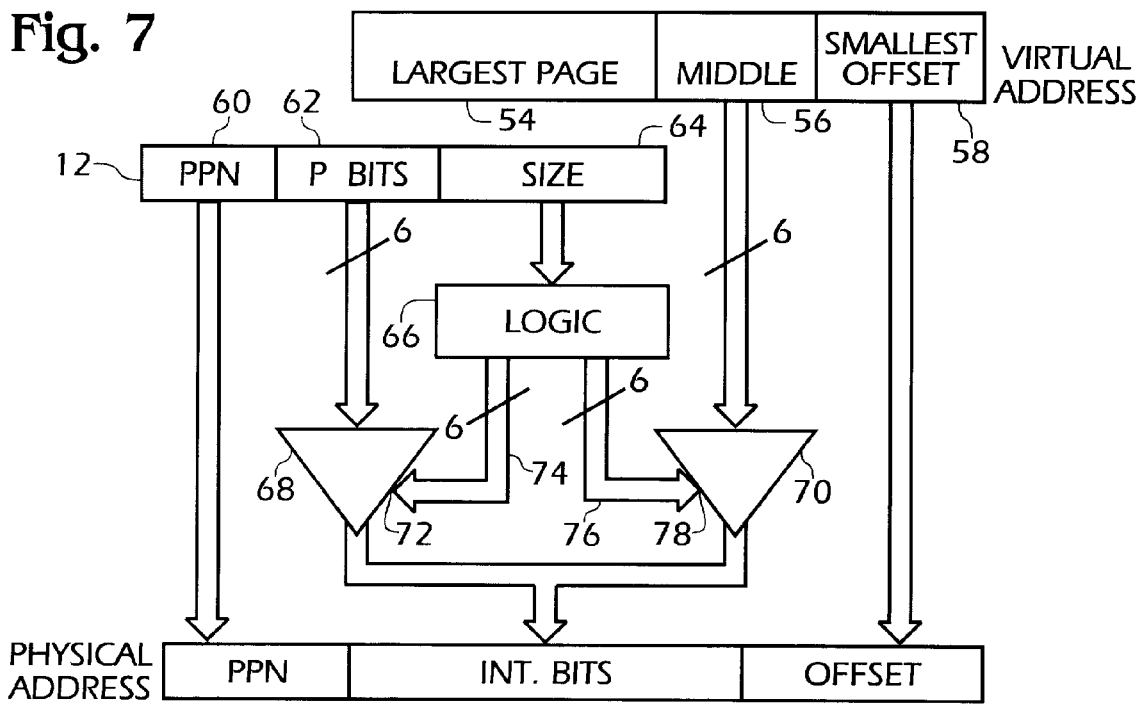
FIG. 7 is a block diagram of the TLB shown in FIG. 2 showing how the various fields of the TLB entry and the virtual address are combined to form a physical address.

FIG. 7 shows how the virtual address and the contents of TLB entry 12 are combined to form the physical address in the TLB when there is a hit therein. The virtual address can be considered to have three separate fields. Field 54 corresponds to the upper address bits for the largest page size. The address bits for the smallest page size make up another field 58. These bits are always a part of the offset component of the physical address and therefore can go directly into the offset field of the physical address. The field 56 between fields 54 and 58 may either be a part of the offset component and thus included in the offset field of the physical address or be a part of the physical page number and not included as part of the physical address, depending upon the size of the virtual page, as described further below.

The TLB entry 12 includes three fields: a PPN field 60, a presence field 62 and a size field 64, as shown in FIG. 7. The size field 64 is fed to a logic block 66 that has two output busses 74 and 76 that drive enable inputs 72 and 78 of tri-state buffer 68 and 70, respectively. Tri-state drivers 68 and 70 act essentially as multiplexers to multiplex either a presence bit from presence field 62 or a bit from the middle field 56 of the virtual address depending upon the page size specified in size field 64. For each corresponding bit in the presence field 62 and the middle field 56 the tri-state drivers 68 and 70 are mutually exclusive, i.e., either tri-state driver 68 or tri-state driver 70 is enabled, but not both since that would produce bus contention. For the example shown in FIG. 6, there are six bits in the PPN field that can either be presence bits or part of the physical page number. It is those six bits that are fed to the tri-state driver 68. Similarly, six bits of the middle field 56 are fed to tri-state driver 70. Tri-state drivers 68 and 70 each include a bank of six individual tri-state drivers that are individually controllable. The outputs of one tri-state driver in driver 68 and one in driver 70 are tied together to form an effective multiplexer so that either the presence bit or the corresponding middle field bit is multiplexed to a corresponding bit in the intermediate field of the physical address depending upon the size. One of ordinary skill in the art could implement the logic included in logic box 66 as well as the multiplexing circuitry based on the description contained herein. Kong also teaches a similar method of combining these fields and is incorporated herein by reference for its teaching on this subject.

Figure 8:
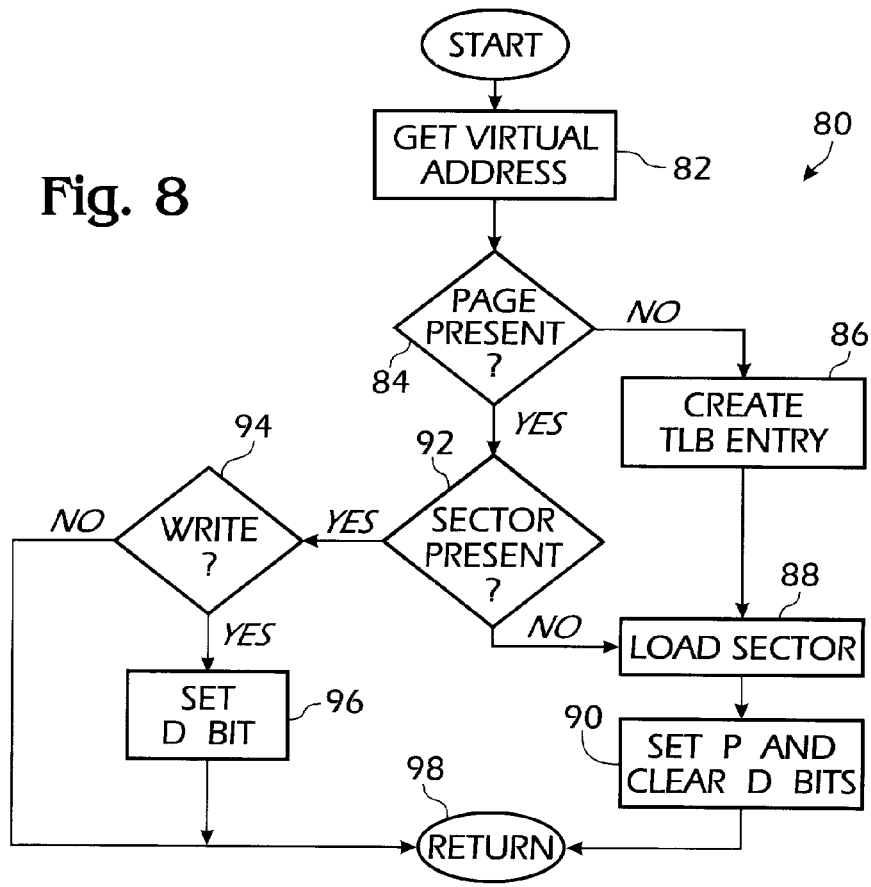
FIG. 8 is a flow chart showing the steps executed by the operating system to manage the sectored virtual memory system according to the invention.

Referring now to FIG. 8, a method 80 is shown in flow chart form that describes the steps that an operating system would take to manage the sectored virtual memory space according to the invention. In the first step 82, the operating system generates a virtual address according to conventional techniques. Step 84 checks to see whether the page is currently present in physical memory. This step is accomplished actually in hardware but could alternatively be accomplished in software. If the page is not present then a page fault occurs and the operating system creates a TLB entry corresponding to the virtual address in the TLB in step 86. Rather than load the entire page, however, the operating system only loads a single sector in step 88 as specified by the virtual address. Once the sector is loaded, the corresponding presence is set and the corresponding dirty bit is cleared in step 90 in the TLB entry that was created in step 86.

If the page is present, on the other hand, the method 80 checks to see whether the sector specified by the virtual address is present in physical memory. This step also is performed in hardware in the preferred embodiment of the invention. If the sector is not present, the operating system loads the sector in step 88 and sets the corresponding presence bit and clears the corresponding dirty bit in step 90. This is effectively a page fault except with a much finer granularity.

If the sector is present then the operating system determines whether the current virtual memory access is a write or, alternatively, a read in step 94. If a read, then the operating system need not take any action. If a write, however, the operating system sets a corresponding dirty bit in the TLB entry corresponding to this virtual address in step 96. Alternatively, the dirty bit could be set in hardware, which would not require the operating system to get involved.

Having described and illustrated the principles of the invention in a preferred embodiment thereof, it should be apparent that the invention can be modified in arrangement and detail without departing from such principles. We claim all modifications and variation coming within the spirit and scope of the following claims.

We claim:

1. A translation look-aside buffer (TLB) for translating a virtual address to a physical address, the virtual address including a virtual page number field, a sector field, and an offset, the TLB comprising:

a plurality of TLB entries, each entry including:
a tag field,
a physical page number field corresponding to a virtual page,
a presence field having a variable number P of bits, wherein each bit in the presence field indicates whether a corresponding sector of the virtual page is present in physical memory, and
a dirty field having a variable number D of bits, wherein each bit in the dirty field indicates whether a corresponding sector of the virtual page has been modified;
a comparator having a first input coupled to the virtual page number field of the virtual address, a second input coupled to the tag fields of the TLB entries, and an output that provides an output signal indicating whether the contents of the virtual page number field is equal to the contents of one of the tag fields;
a logic circuit having a first input coupled to the presence fields of the TLB entries, a second input coupled to the output of the comparator to receive the output signal, a third input coupled to the sector field of the virtual address, and an output that provides a HIT/MISS signal indicating whether a sector of a virtual page is present in physical memory; and
means for combining the virtual address with a physical page number from a corresponding TLB entry if the HIT/MISS signal indicates that the sector addressed by the virtual address is present in physical memory.

2. A translation look-aside buffer (TLB) according to claim 1 wherein:
the tag field in each TLB entry includes a variable number of bits equal to T;
the physical page number field in each TLB entry has a variable number of bits equal to N so that the corresponding physical address has a page size equal to $2^N$, and wherein each TLB entry further comprises
a size field indicating the size of the corresponding virtual page.

3. A translation look-aside buffer (TLB) according to claim 2 wherein, for each TLB entry, the sum of the number of bits T in the tag field, the number of bits N in the physical page number field, the number of bits P in the presence field, and the number of bits D in the dirty field is a constant for all page sizes specified by the size field.

4. A translation look-aside buffer (TLB) according to claim 2 wherein, for each TLB entry, the variable length tag field and the variable length dirty field form a contiguous combined field having a constant number of bits for all page sizes specified by the size field.

5. A translation look-aside buffer (TLB) according to claim 4 wherein, for each TLB entry, the variable length tag field and the variable length presence field form a contiguous combined field having a constant number of bits for all page sizes specified by the size field.

6. A translation look-aside buffer (TLB) according to claim 5 wherein, for each TLB entry, the variable length physical page number field and the variable length presence field form a contiguous combined field having a constant number of bits for all page sizes specified by the size field.

7. A translation look-aside buffer (TLB) according to claim 2 wherein, for each TLB entry, the variable length physical page number field and the variable length dirty field form a contiguous combined field having a constant number of bits for all page sizes specified by the size field.

8. A translation look-aside buffer (TLB) according to claim 2 wherein the sum of P, D and N is a constant for all virtual page sizes specified by the corresponding size field.

9. A translation look-aside buffer (TLB) according to claim 8 wherein the sum of D and P doubles for each successive page size from a minimum page size to a maximum page size as specified by the corresponding size field, whereby the number of bits N in the corresponding physical page number field is reduced accordingly.

10. A translation look-aside buffer (TLB) according to claim 8 wherein the sum of D and P increases by two bits for each successive page size from a minimum page size to a maximum page size as specified by the corresponding size field, whereby the number of bits N in the corresponding physical page number field is reduced accordingly.

11. A translation look-aside buffer (TLB) according to claim 8 wherein each presence bit and each dirty bit in a TLB entry corresponds to variable size sector where the $\log_2(P+D)$ is a non-integer such that the sum of the sizes of the sectors for a TLB entry is equal to the size of the corresponding physical page as specified by the corresponding size field.

12. A translation look-aside buffer (TLB) according to claim 11 wherein one presence bit corresponds to a first sector equal to one-half the physical page size, one presence bit corresponds to a second sector equal to one quarter of the physical page size, and one presence bit corresponds to a third sector equal to one-quarter of the physical page size where P is equal to three such that the sum of the sector sizes equals the size of the corresponding physical page.

13. A translation look-aside buffer (TLB) according to claim 2 wherein the sum of D and P increases by two bits for each successive page size from a minimum page size to a maximum page size as specified by the corresponding size field, whereby the number of bits N in the corresponding physical page number field is reduced by two bits.

14. A translation look-aside buffer (TLB) according to claim 13 wherein one of the additional two bits is an additional presence bit for a corresponding virtual page sector and the other one of the additional two bits is an additional dirty bit for a corresponding virtual page sector.

15. A translation look-aside buffer (TLB) according to claim 14 wherein each presence bit and each dirty bit in a TLB entry corresponds to a fixed size sector.

16. A translation look-aside buffer (TLB) according to claim 15 wherein each variable length presence field includes an unused bit where the $\log_2(P+D)$ is a non-integer.

17. A translation look-aside buffer (TLB) according to claim 15 wherein each variable length dirty field includes an unused bit where the $\log_2(P+D)$ is a non-integer.

18. A translation look-aside buffer (TLB) according to claim 14 wherein each presence bit in a TLB entry corresponds to a fixed size sector.

19. A method of managing a limited amount of physical memory in a virtual memory system, the method comprising:
dividing a virtual page into two or more sectors, the contents of each sector being separately loadable into physical memory;
determining whether a virtual page specified by a virtual address is present in the physical memory;
determining whether a sector within the virtual page specified by the virtual address is present in the physical memory;
accessing a physical location within the sector as specified by the virtual address if the sector is present in physical memory;
creating a corresponding translation look-aside buffer (TLB) entry if the page is not present in the physical memory, where each TLB entry includes a presence field having a presence bit for each sector within the virtual page indicating whether the corresponding sector is present in physical memory and includes a dirty field having a dirty bit for each sector within the virtual page to indicate whether the corresponding sector is dirty; and
loading the sector into physical memory if the sector is not present in the physical memory; and
setting the presence bit corresponding to the sector in a corresponding TLB entry,
wherein the step of dividing a virtual page into two or more sectors includes:
selecting a virtual memory page size, wherein each page includes N number of address bits; and
storing a virtual page size in a size field for a corresponding TLB entry,
wherein the step of creating a corresponding TLB entry if the page is not present in the physical memory includes;
storing a variable length tag associated with the TLB entry in a variable length tag field, wherein the number of bits in the tag field is a function of the page size specified in the size field in the corresponding TLB entry; and
storing a physical page number associated with the virtual address in a variable length physical page number (PPN) field, wherein the number of bits in the PPN field is a function of the page size specified in the size field in the corresponding TLB entry, wherein the size of the PPN field is also a function of the number of sectors into which the virtual pages are divided, the number of bits in the PPN field decreasing as the number of sectors increases.

20. A method of managing a limited amount of physical memory in a virtual memory system the method comprising:
dividing a virtual page into two or more sectors, the contents of each sector being separately loadable into physical memory;
determining whether a virtual page specified by a virtual address is present in the physical memory;
determining whether a sector within the virtual page specified by the virtual address is present in the physical memory;
accessing a physical location within the sector as specified by the virtual address if the sector is present in physical memory,
creating a corresponding translation look-aside buffer (TLB) entry if the page is not present in the physical memory, where each TLB entry includes a presence field having a presence bit for each sector within the virtual page indicating whether the corresponding sector is present in physical memory and includes a dirty field having a dirty bit for each sector within the virtual page to indicate whether the corresponding sector is dirty;

loading the sector into physical memory if the sector is not present in the physical memory; and setting the presence bit corresponding to the sector in a corresponding TLB entry, wherein the step of dividing a virtual page into two or more sectors includes:

selecting a virtual memory page size, wherein each page includes N number of address bits; and storing a virtual page size in a size field for a corresponding TLB entry, wherein the step of creating a corresponding TLB entry if the page is not present in the physical memory includes:

storing a variable length tag associated with the TLB entry in a variable length tag field, wherein the number of bits in the tag field is a function of the page size specified in the size field in the corresponding TLB entry; and storing a physical page number associated with the virtual address in a variable length physical page number (PPN) field, wherein the number of bits in the PPN field is a function of the page size specified in the size field in the corresponding TLB entry, and wherein the step of setting the presence bit corresponding to the sector in a corresponding TLB entry includes storing the presence bit in a bit in the tag field so that all bits in the tag field are occupied by either the tag or the presence bits.

21. A method of managing a limited amount of physical memory in a virtual memory system, the method comprising:

dividing a virtual page into two or more sectors, the contents of each sector being separately loadable into physical memory;

determining whether a virtual page specified by a virtual address is present in the physical memory;

determining whether a sector within the virtual page specified by the virtual address is present in the physical memory;

accessing a physical location within the sector as specified by the virtual address if the sector is present in physical memory, creating a corresponding translation look-aside buffer (TLB) entry if the page is not present in the physical memory, where each TLB entry includes a presence field having a presence bit for each sector within the virtual page indicating whether the corresponding sector is present in physical memory and includes a dirty field having a dirty bit for each sector within the virtual page to indicate whether the corresponding sector is dirty;

loading the sector into physical memory if the sector is not present in the physical memory; and setting the presence bit corresponding to the sector in a corresponding TLB entry, wherein the step of dividing a virtual page into two or more sectors includes:

selecting a virtual memory page size, wherein each page includes N number of address bits; and storing a virtual page size in a size field for a corresponding TLB entry, wherein the step of creating a corresponding TLB entry if the page is not present in the physical memory includes:

storing a variable length tag associated with the TLB entry in a variable length tag field, wherein the number of bits in the tag field is a function of the page size specified in the size field in the corresponding TLB entry; and storing a physical page number associated with the virtual address in a variable length physical page number (PPN) field, wherein the number of bits in the PPN field is a function of the page size specified in the size field in the corresponding TLB entry, and wherein the step of setting the presence bit corresponding to the sector in a corresponding TLB entry includes storing the presence bit in a bit in the physical page number field so that all bits in the physical page number field are occupied by either the physical page number or the presence bits.

22. A method of managing a limited amount of physical memory in a virtual memory system, the method comprising:

dividing a virtual page into two or more sectors, the contents of each sector being separately loadable into physical memory;

determining whether a virtual page specified by a virtual address is present in the physical memory;

determining whether a sector within the virtual page specified by the virtual address is present in the physical memory;

accessing a physical location within the sector as specified by the virtual address if the sector is present in physical memory, creating a corresponding translation look-aside buffer (TLB) entry if the page is not present in the physical memory, where each TLB entry includes a presence field having a presence bit for each sector within the virtual page indicating whether the corresponding sector is present in physical memory and includes a dirty field having a dirty bit for each sector within the virtual page to indicate whether the corresponding sector is dirty;

loading the sector into physical memory if the sector is not present in the physical memory; and setting the presence bit corresponding to the sector in a corresponding TLB entry, wherein the step of dividing a virtual page into two or more sectors includes:

selecting a virtual memory page size, wherein each page includes N number of address bits; and storing a virtual page size in a size field for a corresponding TLB entry, wherein the step of creating a corresponding TLB entry if the page is not present in the physical memory includes:

storing a variable length tag associated with the TLB entry in a variable length tag field, wherein the number of bits in the tag field is a function of the page size specified in the size field in the corresponding TLB entry; and storing a physical page number associated with the virtual address in a variable length physical page number (PPN) field, wherein the number of bits in the PPN field is a function of the page size specified in the size field in the corresponding TLB entry, and wherein the step of accessing a physical location within the sector as specified by the virtual address if the sector is present in physical memory includes:

determining whether the access is a read or a write operation; and storing a dirty bit in a bit in the tag field if the operation is a write so that all bits in the tag field are occupied by either the tag or the dirty bits.

23. A method of managing a limited amount of physical memory in a virtual memory system the method comprising:

dividing a virtual page into two or more sectors, the contents of each sector being separately loadable into physical memory;

determining whether a virtual page specified by a virtual address is present in the physical memory;

determining whether a sector within the virtual page specified by the virtual address is present in the physical memory;

accessing a physical location within the sector as specified by the virtual address if the sector is present in physical memory, creating a corresponding translation look-aside buffer (TLB) entry if the page is not present in the physical memory, where each TLB entry includes a presence field having a presence bit for each sector within the virtual page indicating whether the corresponding sector is present in physical memory and includes a dirty field having a dirty bit for each sector within the virtual page to indicate whether the corresponding sector is dirty;

loading the sector into physical memory if the sector is not present in the physical memory; and setting the presence bit corresponding to the sector in a corresponding TLB entry, wherein the step of dividing a virtual page into two or more sectors includes:

selecting a virtual memory page size, wherein each page includes N number of address bits; and storing a virtual page size in a size field for a corresponding TLB entry, wherein the step of creating a corresponding TLB entry if the page is not present in the physical memory includes:

storing a variable length tag associated with the TLB entry in a variable length tag field, wherein the number of bits in the tag field is a function of the page size specified in the size field in the corresponding TLB entry; and storing a physical page number associated with the virtual address in a variable length physical page number (PPN) field, wherein the number of bits in the PPN field is a function of the page size specified in the size field in the corresponding TLB entry, and wherein the step of accessing a physical location within the sector as specified by the virtual address if the sector is present in physical memory includes:

determining whether the access is a read or a write operation; and storing a dirty bit in a bit in the physical page number field if the operation is a write so that all bits in the physical page number field are occupied by either the physical page number or the dirty bits.

* * * * *